United States Patent
Sherlock (10) Patent No.: US 10,732,024 B2
(45) Date of Patent: Aug. 4, 2020

(54) TIRE PRESSURE IMPACT ON ON-BOARD WEIGHING SYSTEM AND METHOD

(71) Applicant: DEERE & COMPANY, Moline, IL (US)

(72) Inventor: Lance R. Sherlock, Potosi, WI (US)

(73) Assignee: DEERE & COMPANY, Moline, IL (US)

( * ) Notice: Subject to any disclaimer, the term of this patent is extended or adjusted under 35 U.S.C. 154(b) by 204 days.

(21) Appl. No.: 15/881,994

(22) Filed: Jan. 29, 2018

(65) Prior Publication Data

US 2019/0234790 A1 Aug. 1, 2019

(51) Int. Cl.
    G01G 19/08 (2006.01)
    G01G 19/02 (2006.01)
    B60C 23/04 (2006.01)
    B60C 23/00 (2006.01)

(52) U.S. Cl.
    CPC ............ G01G 19/08 (2013.01); B60C 23/003 (2013.01); B60C 23/0493 (2013.01); G01G 19/02 (2013.01)

(58) Field of Classification Search
    CPC ...... G01G 19/02; G01G 19/08; B60C 23/003; B60C 23/0493
    USPC .......................................................... 701/50
    See application file for complete search history.

(56) References Cited

U.S. PATENT DOCUMENTS

| | | | | |
|---|---|---|---|---|
| 3,857,452 A * | 12/1974 | Hartman | ............. | G01G 3/1404 177/139 |
| 4,635,739 A * | 1/1987 | Foley | ..................... | G01G 19/10 177/141 |
| 4,852,674 A * | 8/1989 | Gudat | .................... | G01G 19/10 177/141 |
| 4,854,407 A * | 8/1989 | Wagner | ................ | B62D 53/068 177/141 |
| 5,167,289 A * | 12/1992 | Stevenson | ................ | G01G 5/04 177/141 |
| 5,327,347 A * | 7/1994 | Hagenbuch | ............ | G01G 19/08 701/29.4 |
| 5,675,314 A * | 10/1997 | Chaklader | ........... | B60C 23/0467 340/443 |
| 6,449,582 B1 * | 9/2002 | Chaklader | ........... | B60C 23/0408 702/101 |
| 6,604,025 B2 * | 8/2003 | Ries-Mueller | .......... | B60C 23/00 701/1 |
| 7,616,106 B2 | 11/2009 | Shoyama et al. | | |
| 9,310,242 B2 * | 4/2016 | Kammann | .......... | B60C 23/0408 |
| 10,352,758 B2 * | 7/2019 | Ham | ...................... | G01G 19/08 |
| 2013/0091819 A1 | 4/2013 | Deneault | | |

(Continued)

FOREIGN PATENT DOCUMENTS

EP 2922713 B1 9/2015

*Primary Examiner* — Randy W Gibson
(74) *Attorney, Agent, or Firm* — Taft Stettinius & Hollister LLP; Stephen F. Rost (57) ABSTRACT

A work machine with a first tire having a first tire pressure sensor configured to identify a first tire pressure, a load sensor coupled to the work machine and configured to measure an actual load weight, and a controller in communication with the first tire pressure sensor and the load sensor. Wherein, the controller identifies a tire pressure value with the first tire pressure sensor and the controller determines a current load weight threshold from a plurality of load weight thresholds with the tire pressure value.

20 Claims, 4 Drawing Sheets

(56) References Cited

U.S. PATENT DOCUMENTS

2015/0019165 A1\* 1/2015 Theuss ................... G01G 19/12
                                                      702/173
2016/0017573 A1\* 1/2016 Colwell ................ E02F 9/2029
                                                      701/50

\* cited by examiner

FIG. 4

TIRE PRESSURE IMPACT ON ON-BOARD WEIGHING SYSTEM AND METHOD

FIELD OF THE DISCLOSURE

The present disclosure relates to a load stability system, and more particularly to a load stability system that considers tire pressure when determining a load threshold.

BACKGROUND OF THE DISCLOSURE

A dump vehicle, for example an articulated dump truck (ADT), comprises a power head section and a load-carrying section. The power head section includes a front frame coupled to a vehicle engine, an operator cab and a front wheel axle. The load-carrying section includes a rear frame coupled to a dump body and at least one rear wheel axle. In an ADT, the rear frame is coupled to the front frame by an articulation joint allowing the power head and load-carrying sections to pivot from left to right relative to each other, and by an oscillation joint allowing the power head and load-carrying sections to rotate in relation to one another about an axis extending longitudinally through the vehicle. The articulation and oscillation joints enable the power head and load-carrying sections to move substantially independently of one another.

Often the dump vehicle has tire pressure sensors that monitor the pressure in each of the tires. In conventional dump vehicles, the tire pressure sensors are used to identify when the tire pressure in the corresponding tire is low. Further, some vehicles may provide a user interface that displays the tire pressure from each of the tires.

Similarly, dump vehicles often have a load sensor positioned to identify the weight of a load added to the load carrying section. The load sensor often utilizes the user interface to display the load weight added to the load carrying section.

SUMMARY

One embodiment is a work machine with a first tire having a first tire pressure sensor configured to identify a first tire pressure, a load sensor coupled to the work machine and configured to measure an actual load weight, and a controller in communication with the first tire pressure sensor and the load sensor. Wherein, the controller identifies a tire pressure value with the first tire pressure sensor and the controller determines a current load weight threshold from a plurality of load weight thresholds with the tire pressure value.

In one example of this embodiment, the controller initiates a response when the actual load weight exceeds the current load weight threshold.

Another example includes a second tire having a second tire pressure sensor configured to measure a second tire pressure. In one aspect of this example, the tire pressure value used by the controller to determine the current load weight threshold is a combination of the first tire pressure and the second tire pressure. Another aspect of this example includes a third tire having a third tire pressure sensor configured to measure a third tire pressure and a first axle, a second axle, and a third axle. Wherein the first tire is coupled to a first axle, the second tire is coupled to a second axle, and the third tire is coupled to a third axle. In one aspect of this example the tire pressure value used by the controller to determine the current load weight threshold is a combination of the first tire pressure, the second tire pressure, and the third tire pressure.

Another example includes a fourth tire coupled to the first axle and having a fourth tire pressure sensor configured to measure a fourth tire pressure, a fifth tire coupled to the second axle and having a fifth tire pressure sensor configured to measure a fifth tire pressure, and a sixth tire coupled to the third axle and having a sixth tire pressure sensor configured to measure a sixth tire pressure. Wherein the tire pressure value used by the controller to determine the current load weight threshold is a combination of the first tire pressure, second tire pressure, third tire pressure, fourth tire pressure, fifth tire pressure, and sixth tire pressure.

Another example includes a user interface configured to signal the response when the controller identifies that the actual load weight exceeds the current load weight threshold. In one aspect of this example the user interface is a display screen that displays a visual warning when the controller determines that the actual load weight exceeds the current load weight threshold.

In yet another example, the response initiated by the controller is a governor that limits the maximum speed of the work machine when the controller determines that the actual load weight exceeds the current load weight threshold.

In one example the response initiated by the controller is a drive system lock that prohibits the work machine from moving when the controller determines that the actual load weight exceeds the current load weight threshold.

Another embodiment is a monitoring system of a work machine having a frame and a dump body with a plurality of tires coupled to the work machine, a plurality of tire pressure sensors fluidly coupled to the plurality of tires and configured to measure a tire pressure from each of the plurality of tires, a load sensor positioned at least partially between the dump body and frame, and a controller. Wherein, the plurality of tire pressure sensors communicates the tire pressure from each of the plurality of tires to the controller and the load sensor communicates a load weight to the controller. Further wherein the controller converts the tire pressure from each of the plurality of tires into a current tire pressure value, determines a current load weight threshold based on the current tire pressure value, compares the load weight to the current load weight threshold, and initiates a response if the load weight exceeds the current load weight threshold.

One example of this embodiment has a user interface that displays the plurality of tire pressures, the load weight, and the current load weight threshold.

Another example has a user interface, wherein the controller sends a command to the user interface to signal a visual warning when the load weight is greater than the current load weight threshold.

In yet another example the controller sends a command to signal an audible warning when the load weight is greater than the current load weight threshold.

One example has a remote device, wherein the controller sends the current load weight threshold to the remote device.

In another example the controller determines the current tire pressure value based on the lowest tire pressure of the plurality of tire pressures.

Yet another embodiment is a method of monitoring a work machine that includes providing a controller, at least one tire pressure sensor, and a load weight sensor, determining, with the controller, at least one tire pressure value with the tire pressure sensor, determining, with the controller via the load weight sensor, a load weight, establishing, with the controller, a load weight threshold based on the tire pressure value, comparing, with the controller, the load weight to the load weight threshold, and sending an indication to a user, with the controller, if the load weight exceeds the load weight threshold.

In one example of this embodiment, the indication to the user is a visual or audible signal.

In yet another example, the establishing the load weight threshold based on the tire pressure value step includes determining the sum of more than one tire pressure value.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
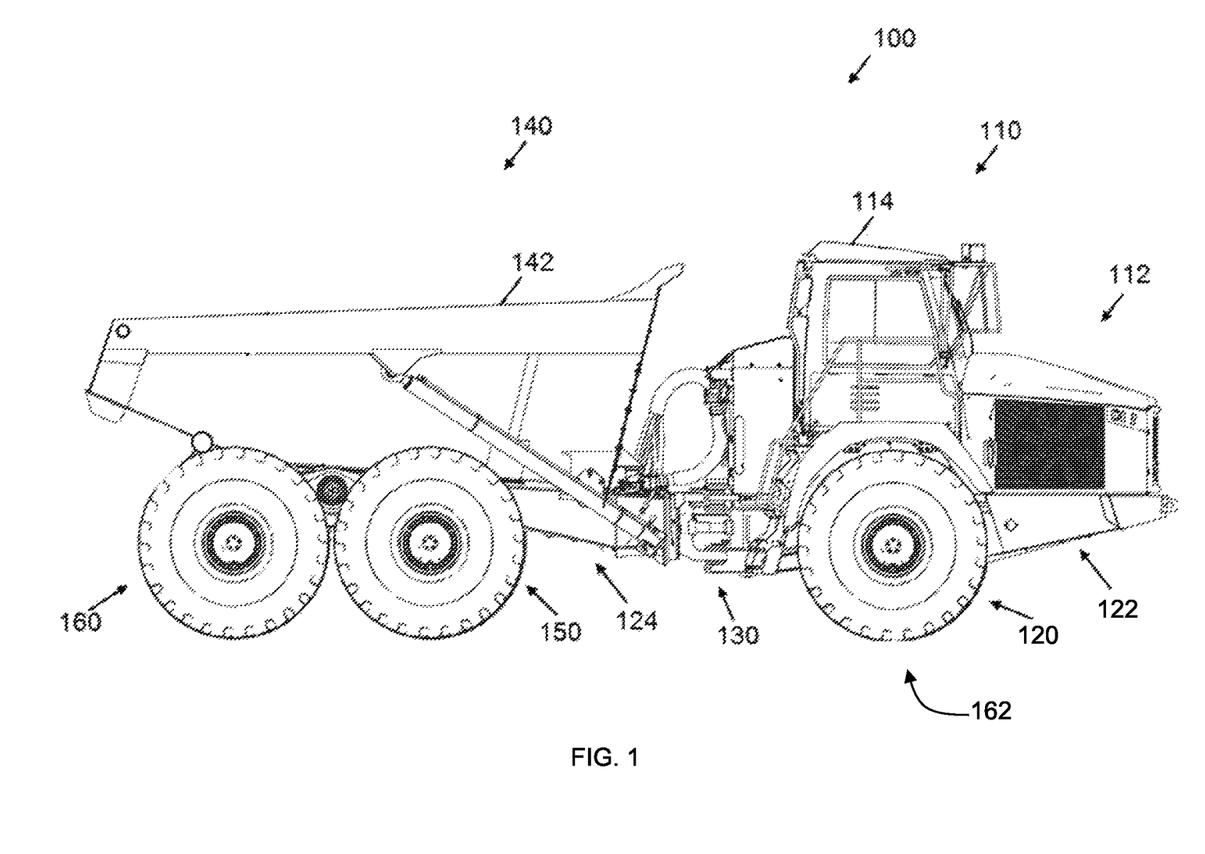
FIG. 1 is an exemplary dump vehicle having a power head section and a load-carrying section.

FIG. 1 illustrates an exemplary dump vehicle 100 including a power head section 110 and a load carrying section 140. The power head section 110 includes a vehicle engine or motor 112, an operator cab 114 and a front axle and wheels 120 coupled to a front frame 122. The load carrying section 140 includes a dump body 142, a middle axle and wheels 150 and a rear axle and wheels 160 all coupled to a rear frame 124. The motor 112, front axle and wheels 120, middle axle and wheels 150, and rear axle and wheels 160 may be a part of a drive system 162 that provides movement to the dump vehicle 100. The drive system may control the available speed and direction of the dump vehicle 100 as is known in the art.

The front frame 122 of the power head section 110 is coupled to the rear frame 124 of the load carrying section 140 by articulation and oscillation joints 130. The articulation joint enables the power head section 110 and the load carrying section 140 to pivot relative to one another about a vertical axis for steering the vehicle 100, and the oscillation joint allows the power head section 110 and the load carrying section 140 to rotate relative to one another about a longitudinal axis extending along the length of the vehicle 100.

Figure 2:
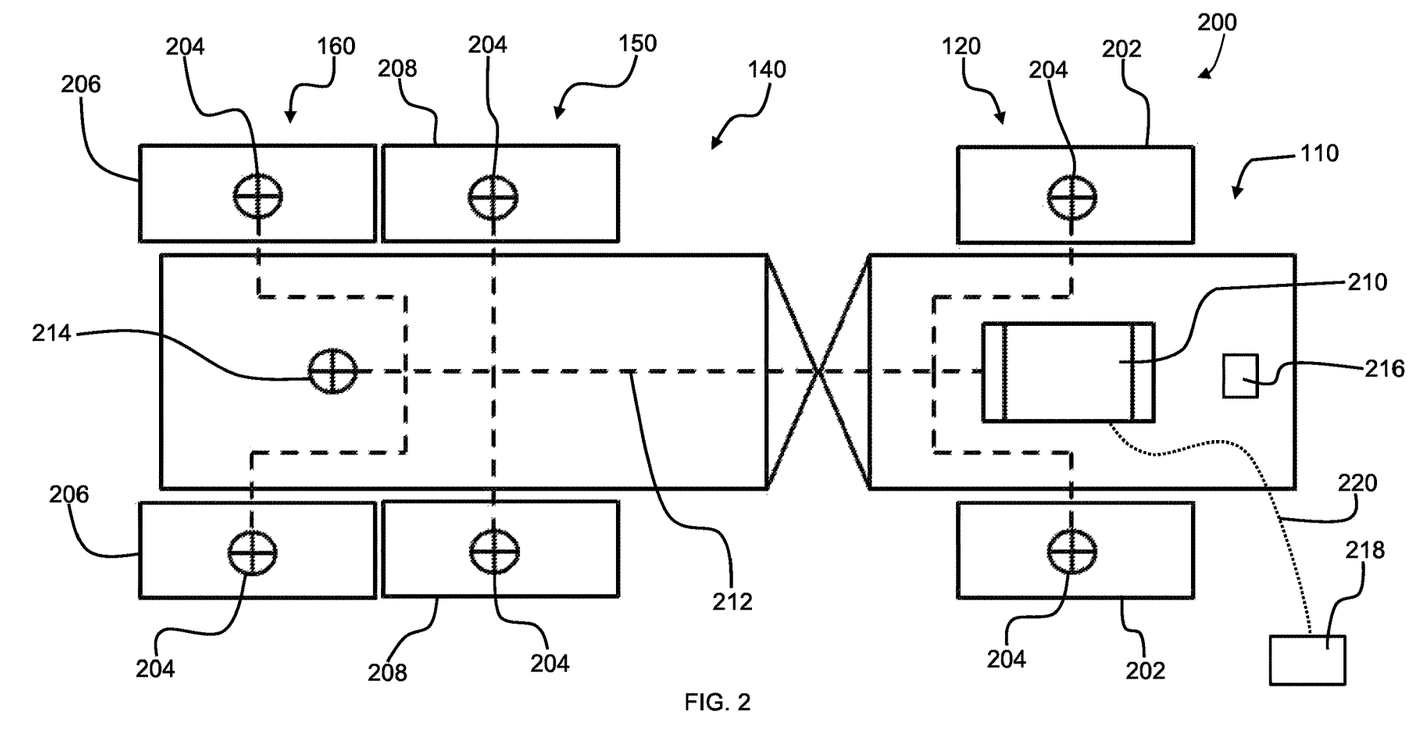
FIG. 2 is a top schematic view of a system for a dump vehicle.

Referring now to FIG. 2, a top schematic view 200 of the dump vehicle 100 is shown. In the schematic view 200, front tires 202 are coupled to the front axles and wheels 120. Further, a tire pressure sensor 204 is shown positioned in each of the front tires 202. Similarly, rear tires 206 are shown coupled to the rear axle and wheels 160 and middle tires 208 are shown coupled to the middle axle and wheels 150. Each of the middle and rear tires 206, 208 may also have a tire pressure sensor 204 positioned therein. The tire pressure sensors 204 may be positioned along a rim of the tire in a tire chamber. Alternatively, in one embodiment the tire pressure sensors are embedded in the rubber of the tires. Accordingly, this disclosure considers many different tire sensor locations and contemplates other tire sensor locations known to those having skill in the relevant art.

In one aspect of this embodiment, each of the tire pressure sensors 204 may be fluidly coupled to a tire chamber of the corresponding tires 202, 206, 208. In this configuration, the tire pressure sensors 204 may identify a tire pressure value of the tire chamber. Further, each tire pressure sensor 204 may communicate with a controller 210 through a communication channel 212. The communication channel 212 can be any type of communication protocol known in the art, including both wired and wireless communication protocols. More specifically, in one embodiment the communication channel 212 may be a wire harness that electrically couples the tire pressure sensors 204 to the controller 210. In a different embodiment, the communication channel 212 is a wireless communication protocol that allows the tire pressure sensors 204 to wirelessly communicate with the controller 210.

The controller 210 may utilize the communication channel 212 to identify a pressure value in each of the respective tires 202, 206, 208. In other words, the controller 210 may use the tire pressure sensors 204 to identify the tire pressure value in the tire chambers for the tires 202, 206, 208. The controller 210 may associate each tire pressure sensor 204 with the particular tire 202, 206, 208 that it is monitoring. Alternatively, the controller 210 may add each of the tire pressure sensor values together and generate one aggregate tire sensor value.

The controller 210 can further manipulate the tire pressure value data into different forms. In one non-exclusive example, the controller 210 may generate an average tire pressure value by averaging the tire pressure value from each of the tire pressure sensors 204. In another embodiment, the controller 210 may identify the lowest tire pressure from the tire pressure sensors 204. Alternatively, in a different embodiment, the controller 210 may identify the highest tire pressure value from the tire pressure sensors 204. Accordingly, this disclosure considers many different uses by the controller 210 of the tire pressure values received from the tire pressure sensors 204.

The controller 210 may also communicate with a load sensor 214 through the communication channel 212. The load sensor 214 may be positioned at a location at least partially between the dump body 142 and the rear frame 124 and designed to identify an actual load in the dump body 142. However, the location of the load sensor 214 is not limiting and other locations are considered herein. The actual load may be the amount of material or debris positioned in the dump body 142. The load sensor 214 may identify to the controller 210 a value that corresponds with the weight of the material added to the dump body 142. Accordingly, the controller 210 may be able to utilize the tire pressure sensors 204 to identify the tire pressure values of the tires 202, 206, 208 and the load sensor 214 to identify the actual load in the dump body 142.

In one aspect of this embodiment, the vehicle 100 may have a user interface 216 coupled thereto. The user interface 216 may be a screen, a speaker, a light, a camera, a microphone, or any other device or combination of devices used to indicate a signal to a user positioned in the operator cab 114. In one non-limiting example, the user interface 216 is a display capable of displaying the tire pressure values of each of the tires 202, 206, 208 and the actual load value identified by the load sensor 214. Alternatively, the user interface 216 may be one or more lights or a speaker that provide visual or audible signals when the controller 210 identifies certain conditions. In one example, the user interface 216 provides a vibrational input to the user when the controller 210 identifies certain conditions. Accordingly, this disclosure considers many different types of user interfaces, even those not specifically identified.

One aspect of this disclosure may include a remote device 218 that communicates with the controller 210 via a remote communication channel 220. The remote device 218 may provide substantially similar information as the user interface 216 to a remote user. The remote communication channel 220 may utilize wired or wireless communication protocols to transfer data with the controller 210. In one non-exclusive example, the remote communication channel 220 is a wireless communication protocol that is the same or similar to those used in mobile phones. Regardless of the communication protocol, the remote device 218 may receive and display tire pressure values, actual load values, and other signals from the controller 210 and display or otherwise indicate them to the user via the remote device 218.

While a single controller 210 is shown and described throughout, this disclosure also considers using multiple controllers instead of just one. Further, the controller 210 or controllers may have a memory unit and a processor as is known in the art. Certain executable programs or functions may be stored in the memory unit of the controller and executed by the processor. Further, the memory unit may store data such as threshold values, lookup charts, functions, graphs or the like. The processor and the memory unit may be located remotely from one another or on substantially the same component.

The load sensor 214 described herein can be any type of sensor known in the art and capable of determining the actual load in the dump body 142. In one embodiment, a strain gauge or other load cell may be positioned on a portion of the load carrying section 140 that experiences strain when the dump body 142 is filled. In another aspect of this disclosure, displacement sensors may be positioned on the suspension of the load carrying section 140 and identify the actual load based on the displacement of the suspension. In yet another embodiment, a camera may be used to view the dump body 142 and estimate the actual load. Accordingly, this disclosure considers many different sensors and techniques for measuring the actual load and is not limited to any particular one.

Similarly, the tire pressure sensors 204 can be any type of sensor known in the art capable of being used to determine a tire pressure. More specifically, the tire pressure sensors 204 may be deflection sensors that identify how much the tire deflects. In this example, the tire pressure may be estimated as a product of the deflection of the tire along with other known factors for the particular tire being used. Alternatively, the tire pressure sensors 204 may be pressure sensors that identify the fluid pressure in the tire chamber. Further still, in one embodiment of the present disclosure the tire pressure sensors 204 are embedded in the rubber of the tire when the tire is manufactured and measure temperature, acceleration, pressure, or strain of the surrounding tire to identify a load, pressure, and temperature of the tire.

Figure 3:
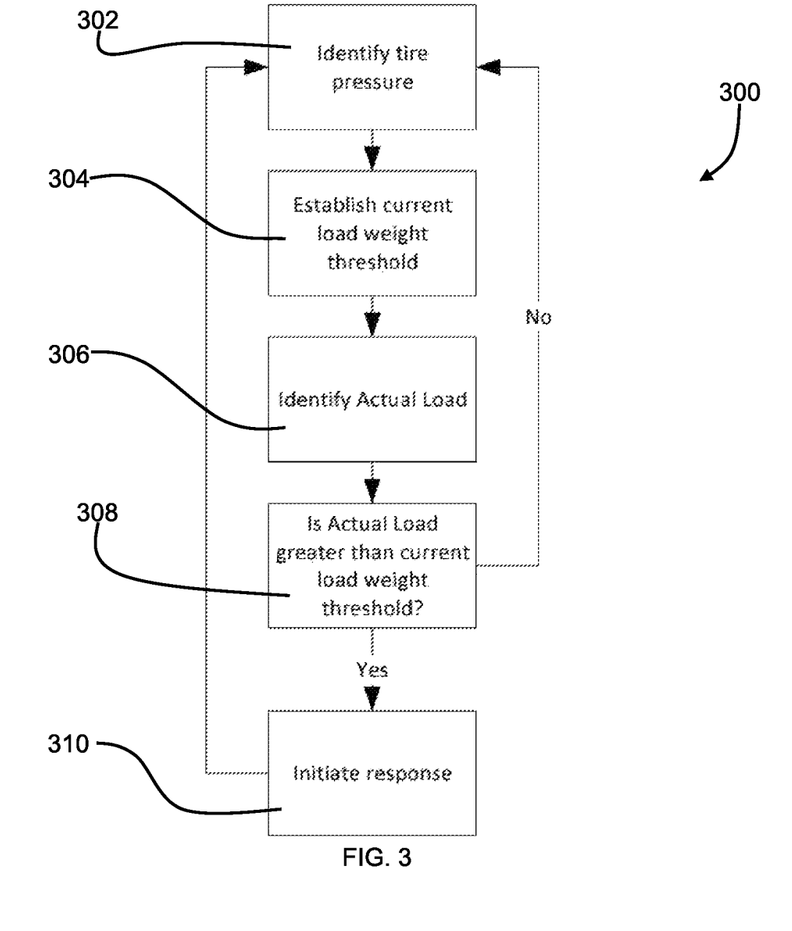
FIG. 3 is a logic flowchart for determining a current load weight threshold of the dump vehicle.

In one aspect of the present disclosure, the tire pressure sensors 204 and the load sensor 214 may be monitored by the controller 210 to establish a variable current load weight threshold based on the tire pressure conditions. More specifically, FIG. 3 shows one exemplary logic flowchart 300 that could be implemented by the controller 210. In the logic flowchart 300 of FIG. 3, the controller 210 may identify the tire pressure value as described above in box 302. In box 302, the controller 210 may average all available tire pressure values, establish a minimum tire pressure value, establish a maximum tire pressure value, or address each tire pressure value as it relates to a particular tire 202, 206, 208.

Once the controller 210 has established one or more tire pressure values, the controller 210 may determine a current load weight threshold in box 304. The current load weight threshold may be a load weight value that is estimated to provide a stable vehicle 100 when the tires 202, 206, 208 are filled with the tire pressure identified in box 302. In one non-exclusive example, the vehicle 100 may have an ideal average tire pressure value and an ideal load threshold value. If the actual average tire pressure value determined in box 302 results in an average tire pressure value that is less than the ideal average tire pressure value, the ideal load threshold value may be reduced. In other words, if the controller 210 identifies one or more tires that have a tire pressure value that could result in an unstable vehicle 100, the controller 210 may lower the current load weight threshold to ensure that the vehicle will not be overloaded in view of the tire pressure values.

The controller 210 may identify the actual load of the dump body 142 in box 306. In box 306, the controller 210 may utilize the load sensor 214 to determine the weight of a load added to the dump body 142 as described above. Accordingly, the actual load is representative of the weight of material in the dump body 142.

In box 308, the controller 210 compares the actual load determined in box 306 with the current load weight threshold determined in box 304. As described above, the current load weight threshold may vary with different tire pressures in order to ensure the vehicle 100 remains stable. Accordingly, in box 308 the actual load of the vehicle 100 will be compared to the current load weight threshold.

If the actual load is less than the current load threshold, the controller 210 may return to box 302 to restart the logic flowchart 300. However, if the actual load is greater than the current load weight threshold, the controller 210 initiates a response in box 310. The response initiated by the controller 210 may be many different types of responses depending on the needs of the user. More specifically, the response in box 310 may be an audio or visual signal from the user interface 216. Alternatively, the response may be a vibrational input. Further still, in one embodiment the controller 210 may limit the available speed of the vehicle 100 as part of the response in box 310. More specifically, if the actual load surpasses the current load weight threshold a drive system of the vehicle 100 may be locked by the controller 210 to restrict or limit movement. In yet another aspect of this disclosure, the response initiated in box 310 may be a signal sent to the remote device 218. The signal may indicate to the user of the remote device that the actual load is too high for the tire pressure conditions identified by the controller 210.

Referring now to Table 1 below, several scenarios for the logic flowchart 300 are described as some non-limiting examples of the application of this disclosure. Table 1 shows six tires being monitored by the controller 210, however this disclosure considers embodiments that have more or less tires. A person skilled in the art understands that the teachings of this disclosure are applicable to any number of tires on a work machine.

In Table 1, each tire 1-6 is shown having an "ideal," "low," or "flat" tire pressure reading in the column under the corresponding tire. The "ideal" tire pressure reading may be the expected or preset tire pressure for the specific tire being monitored. The ideal tire pressure value may be stored in the controller 210 either by the user or through a tire identification mechanism when the tire is installed. In one aspect of this embodiment, the ideal tire pressure may be altered by the user via the user interface. The designation of "ideal" in Table 1 indicates that the measured tire pressure is at about the ideal tire pressure.

Tires 1-6 may also have a "low" pressure reading as indicated in Table 1. The "low" pressure reading may represent a situation where the corresponding tire has a pressure less than the ideal tire pressure described above. In one non-exclusive embodiment, an example of a "low" tire pressure may be anything between 5% to 80% lower than the ideal tire pressure. However, the use of the term "low" is meant only for exemplary purposes, and a person skilled in the art understands that this can represent many different potential pressure values or ranges.

Tires 1-6 may also have a "flat" pressure reading as indicated in Table 1. The "flat" pressure reading may represent a situation where the corresponding tire has a pressure that is substantially less than the ideal tire pressure described above. In one non-exclusive embodiment, an example of a "flat" tire pressure may be anything greater than 80% lower than the ideal tire pressure. However, the use of the term "flat" is meant only for exemplary purposes, and a person skilled in the art understands that this can represent many different potential pressure values.

The "Average" column may represent the average tire pressure value of all of the tires 1-6 in Table 1. In the non-exclusive example in Table 1, the Average value may be "Ideal," "<Ideal," "Low," and "Extremely Low." When the Average is Ideal, as it is in Scenario A, the controller 210 may determine that the average tire pressure of the tires 1-6 is within and ideal tire pressure range. Similarly, when the Average is <Ideal, the controller 210 may determine that the average tire pressure is less than the range for the ideal tire pressure. In one non-exclusive example, the <Ideal range may be between 5% and 15% lower than the ideal pressure average. Similarly, when the average is Low the controller 210 may determine that the average tire pressure is between 15% and 50% lower than the ideal pressure average. Lastly, when the Average is Extremely Low the controller 210 may determine that the average tire pressure is greater than 50% lower than the ideal pressure average.

The "Current Load Weight" column from Table 1 may represent the current load weight threshold established by the controller 210. In the non-exclusive example in Table 1, the Current Load Weight Threshold value may be "Ideal," "<Ideal," "Low," and "Extremely Low." When the Current Load Weight Threshold is Ideal, as it is in Scenario A, the controller 210 may determine that each of the pressure values from Tires 1-6 are Ideal or that the Average is Ideal. Further, when the Current Load Weight Threshold is ideal, the controller 210 may set the current load weight threshold to an ideal load weight in box 304 of the logic flowchart 300. The ideal load weight threshold may be the highest weight value allowed to be positioned in the dump body 142 under ideal tire pressure conditions.

Similarly, when the Current Load Weight Threshold is <Ideal, the controller 210 may determine that one of the Tires 1-6 has a low pressure or that the Average tire pressure is <Ideal. In one non-exclusive example, the <Ideal identifier may result in the controller 210 establishing a current load weight threshold that is 10% lower than the ideal load weight. Similarly, when the average is Low the controller 210 may determine that several of the Tires 1-6 have a low pressure or that the Average tire pressure is low. In one non-exclusive example, the Low identifier may result in the controller 210 establishing a current load weight threshold that is 30% lower than the ideal load weight. Lastly, when the controller 210 identifies a substantial number of the Tires 1-6 have a low tire pressure, or that the Average tire pressure is Extremely Low, the controller 210 may set a current load weight threshold that is 90% lower than the ideal load weight. Further, in one non-limiting example the Current Load Weight Threshold may be Extremely Low when the controller 210 identifies that any of the Tires 1-6 indicates a flat.

TABLE 1

| | Tire 1 | Tire 2 | Tire 3 | Tire 4 | Tire 5 | Tire 6 | Average | Current Load Weight Threshold |
|---|---|---|---|---|---|---|---|---|
| Scenario A | Ideal | Ideal | Ideal | Ideal | Ideal | Ideal | Ideal | Ideal |
| Scenario B | Ideal | Ideal | low | ideal | ideal | ideal | <Ideal | <Ideal |
| Scenario C | low | low | low | ideal | ideal | ideal | Low | Low |
| Scenario D | low | low | low | low | low | low | Extremely Low | Extremely Low |
| Scenario E | flat | ideal | ideal | ideal | ideal | ideal | Low | Extremely Low |

The above percentages and values are meant only for exemplary purposes and are not meant to limit this disclosure. A person skilled in the art understands that other percentages and ranges could be used as well without straying from the teaching of this disclosure.

Referring now to Scenario A, which corresponds with the adjacent row, each of tires 1-6 are at an Ideal tire pressure. In turn, the controller 210 determines an Ideal Average pressure. Further, the Current Load Weight Threshold will be set to Ideal either because all of the Tires 1-6 have an ideal pressure or because the Average is Ideal.

In Scenario B, which corresponds with the adjacent row, all of the Tires 1, 2, and 4-6 have an Ideal pressure value and Tire 3 has a low pressure value. In this configuration, the controller 210 would calculate an Average that is < Ideal because of the low pressure value of Tire 3. Further, the Current Load Weight Threshold will be set to < Ideal either because Tire 3 is low or because the Average is < Ideal.

In Scenario C, which corresponds with the adjacent row, Tires 1-3 have a low pressure value while Tires 4-6 have an Ideal pressure value. In this configuration, the controller 210 would calculate an Average that is Low because of the low pressure value of Tires 1-3. Further, the Current Load Weight Threshold will be set to Low either because more than one Tire is low or because the Average is Low.

In Scenario D, which corresponds with the adjacent row, Tires 1-6 have a low pressure value. In this configuration, the controller 210 would calculate an Average that is Extremely Low because of the low pressure value of Tires 1-6. Further, the Current Load Weight Threshold will be set to Extremely Low either because all of the Tires are low or because the Average is Low.

In Scenario E, which corresponds with the adjacent row, Tire 1 may be flat while Tires 2-6 have an ideal pressure value. In this configuration, the controller 210 may calculate an Average that is Low because of the flat pressure value of Tire 1. However, the Current Load Weight Threshold will be set to Extremely Low because the flat Tire 1 creates a stability issue even though the average tire pressure is only low.

Figure 4:
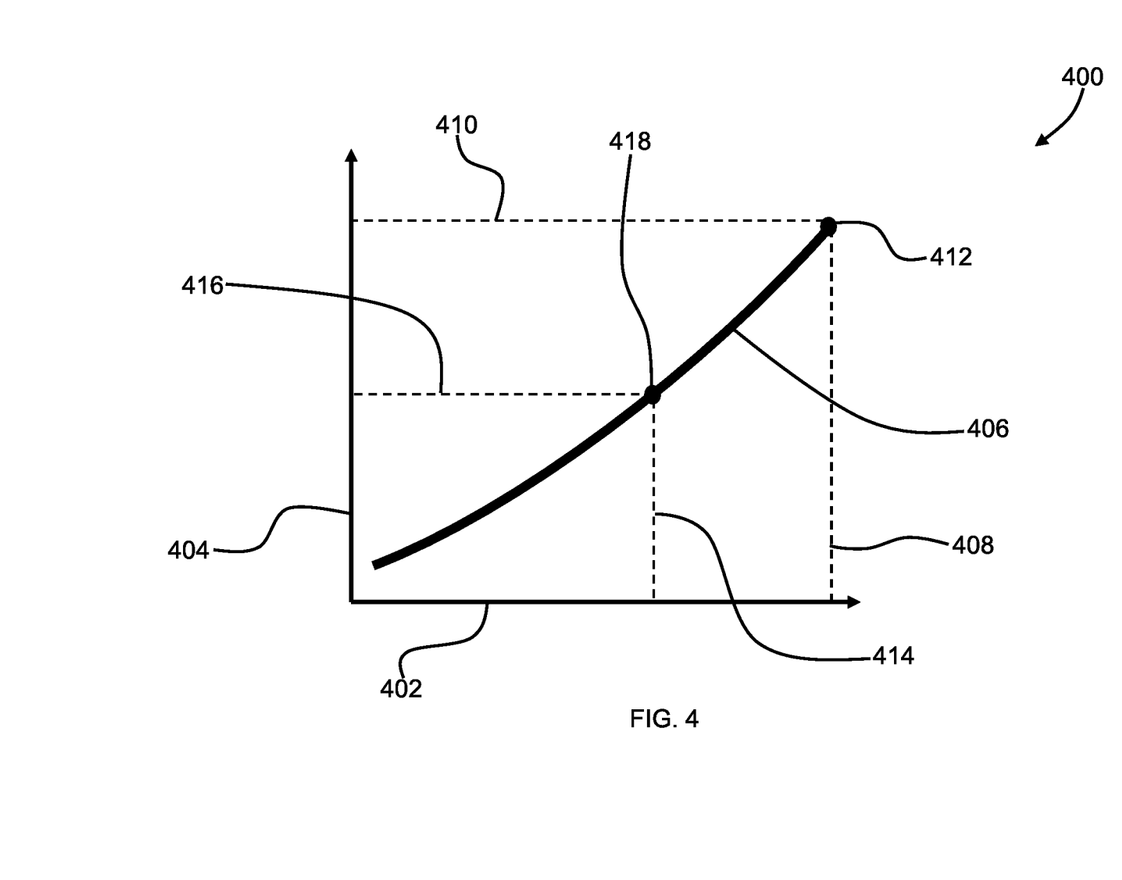
FIG. 4 is an average tire pressure versus load weight threshold graph.

In one non-exclusive embodiment Table 1 values and ranges may be stored in the controller 210 and used as a lookup table to determine the current load weight threshold in box 304. Alternatively, an average tire pressure versus load weight threshold graph 400 may be used as illustrated in FIG. 4. More specifically, the graph 400 may have an x-axis that represents the average tire pressure 402 determined by the controller 210 and a y-axis that represents potential load weight threshold values 404. Further, a pressure curve 406 may be defined through a quadrant of the graph 400. The pressure curve 406 may represent the load weight thresholds that correspond with the average tire pressures calculated by the controller 210. For example, when the average tire pressure is the ideal tire pressure 408, the tire pressure curve 406 may be at the ideal load weight threshold 410 at an ideal conditions point 412. Alternatively, when the average tire pressure is at an actual tire pressure value 414, a current load weight threshold point 418 may be positioned along the pressure curve 406 at a location that corresponds with an actual load weight threshold value 416. In other words, the graph 400 of FIG. 4 represents one non-exclusive example of how the current load weight threshold of box 304 may be determined as a function of the average tire pressure.

The Table 1 or graph 400 may be generated based on test data for the actual vehicle on which the system will be applied. In one non-exclusive example, a tipping test may be implemented on the vehicle under various load conditions and tire pressure conditions to identify the current load weight threshold for the vehicle. A person having skill in the relevant art understands that the actual values implemented for a table or graph utilizing the teachings of this disclosure will vary depending on the vehicle in which they are applied.

A person skilled in the art understands that there are many other ways to alter load threshold values based on measured tire pressure values and this disclosure provides limited examples that are not meant to be exhaustive. Accordingly, this disclosure also considers embodiments that are apparent to those having skill in the art of this disclosure. Further, while an articulated dump truck is shown and described herein, this disclosure could be applied to any work machine having a load sensor and tire pressure sensors and is not limited to articulated dump trucks.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this pertains and which fall within the limits of the appended claims

The invention claimed is:

1. A work machine comprising:
a first tire having a first tire pressure sensor configured to identify a first tire pressure;
a load sensor coupled to the work machine and configured to measure an actual load weight; and
a controller in communication with the first tire pressure sensor and the load sensor;
wherein, the controller identifies a tire pressure value with the first tire pressure sensor;
further wherein, the controller determines a current load weight threshold from a plurality of load weight thresholds with the tire pressure value.

2. The work machine of claim 1, further wherein the controller initiates a response when the actual load weight exceeds the current load weight threshold.

3. The work machine of claim 1, further comprising a second tire having a second tire pressure sensor configured to measure a second tire pressure.

4. The work machine of claim 3, wherein the tire pressure value used by the controller to determine the current load weight threshold is a combination of the first tire pressure and the second tire pressure.

5. The work machine of claim 3, further comprising:
a third tire having a third tire pressure sensor configured to measure a third tire pressure; and
a first axle, a second axle, and a third axle;
wherein the first tire is coupled to a first axle, the second tire is coupled to a second axle, and the third tire is coupled to a third axle.

6. The work machine of claim 5, further wherein the tire pressure value used by the controller to determine the current load weight threshold is a combination of the first tire pressure, the second tire pressure, and the third tire pressure.

7. The work machine of claim 5, further comprising:
a fourth tire coupled to the first axle and having a fourth tire pressure sensor configured to measure a fourth tire pressure;
a fifth tire coupled to the second axle and having a fifth tire pressure sensor configured to measure a fifth tire pressure; and
a sixth tire coupled to the third axle and having a sixth tire pressure sensor configured to measure a sixth tire pressure;
wherein the tire pressure value used by the controller to determine the current load weight threshold is a combination of the first tire pressure, second tire pressure, third tire pressure, fourth tire pressure, fifth tire pressure, and sixth tire pressure.

8. The work machine of claim 2, further comprising a user interface configured to signal the response when the controller identifies that the actual load weight exceeds the current load weight threshold.

9. The work machine of claim 8, further wherein the user interface is a display screen that displays a visual warning when the controller determines that the actual load weight exceeds the current load weight threshold.

10. The work machine of claim 2, further wherein the response initiated by the controller is a governor that limits a maximum speed of the work machine when the controller determines that the actual load weight exceeds the current load weight threshold.

11. The work machine of claim 2, further wherein the response initiated by the controller is a drive system lock that prohibits the work machine from moving when the controller determines that the actual load weight exceeds the current load weight threshold.

12. A monitoring system of a work machine having a frame and a dump body, comprising:
a plurality of tires coupled to the work machine;
a plurality of tire pressure sensors, where at least one tire pressure sensor is fluidly coupled to each of the plurality of tires and configured to measure a tire pressure from each of the plurality of tires;

a load sensor positioned at least partially between the dump body and frame; and a controller;

wherein, the plurality of tire pressure sensors communicates the tire pressure from each of the plurality of tires to the controller and the load sensor communicates a load weight to the controller;

further wherein the controller converts the tire pressure from each of the plurality of tires into a current tire pressure value, determines a current load weight threshold based on the current tire pressure value, compares the load weight to the current load weight threshold, and initiates a response if the load weight exceeds the current load weight threshold.

13. The monitoring system of claim 12, further comprising a user interface that displays the plurality of tire pressures, the load weight, and the current load weight threshold.

14. The monitoring system of claim 12, further comprising a user interface, wherein the controller sends a command to the user interface to signal a visual warning when the load weight is greater than the current load weight threshold.

15. The monitoring system of claim 12, further wherein the controller sends a command to signal an audible warning when the load weight is greater than the current load weight threshold.

16. The monitoring system of claim 12, further comprising a remote device, wherein the controller sends the current load weight threshold to the remote device.

17. The monitoring system of claim 12, further wherein the controller determines the current tire pressure value based on the lowest tire pressure of the plurality of tire pressures.

18. A method of monitoring a work machine comprising:

providing a controller, at least one tire pressure sensor, and a load weight sensor;

determining, with the controller, at least one tire pressure value with the tire pressure sensor;

determining, with the controller via the load weight sensor, a load weight;

establishing, with the controller, a load weight threshold based on the tire pressure value;

comparing, with the controller, the load weight to the load weight threshold; and sending an indication to a user, with the controller, if the load weight exceeds the load weight threshold.

19. The method of monitoring a work machine of claim 18, wherein the indication to the user is a visual or audible signal.

20. The method of monitoring a work machine of claim 18, further wherein the establishing the load weight threshold based on the tire pressure value step includes determining the sum of more than one tire pressure value.

* * * * *